United States Patent [19]

Ardon

[11] Patent Number: 5,848,053
[45] Date of Patent: Dec. 8, 1998

[54] TELECOMMUNICATIONS NETWORK FOR SERVING USERS FROM MULTIPLE SWITCHES

[75] Inventor: Menachem Tsur Ardon, Naperville, Ill.

[73] Assignee: Lucent Technologies Inc., Murray Hill, N.J.

[21] Appl. No.: 567,759

[22] Filed: Dec. 5, 1995

[51] Int. Cl.⁶ .................................................. H04M 3/00
[52] U.S. Cl. ........................ 370/218; 370/359; 370/360; 370/376; 370/377; 370/397; 370/420; 370/522; 379/221; 379/230
[58] Field of Search ................................ 370/216–220, 370/351, 352, 357, 358, 359, 375, 376, 377, 389, 395–397, 522; 379/201, 210, 211, 212, 219–221, 230

[56] References Cited

U.S. PATENT DOCUMENTS

| | | |
|---|---|---|
| 5,365,524 | 11/1994 | Hiller et al. ............................ 370/376 |
| 5,473,679 | 12/1995 | La Porta et al. ........................ 379/221 |
| 5,550,912 | 8/1996 | Akinpelu et al. ...................... 379/201 |
| 5,559,877 | 9/1996 | Ash et al. ............................... 379/221 |
| 5,574,783 | 11/1996 | Dunn ...................................... 379/230 |
| 5,661,792 | 8/1997 | Akimpelu et al. ..................... 379/221 |

*Primary Examiner*—Douglas W. Olms
*Assistant Examiner*—Seema S. Rao
*Attorney, Agent, or Firm*—Werner Ulrich

[57] ABSTRACT

A method or apparatus for offering multiple switch access to selected lines and trunks of a multiple telecommunications switch complex. The selected lines and trunks are connected to peripheral units whose outputs are distributed by a network to a group of switches. The switches are interconnected by a second network. Advantageously, the selected lines can be served by several switches so that the failure of one switch does not deprive these lines of service. Advantageously, the two networks and the group of switches form a giant switch having high reliability.

15 Claims, 6 Drawing Sheets

TELECOMMUNICATIONS NETWORK FOR SERVING USERS FROM MULTIPLE SWITCHES

TECHNICAL FIELD

This invention relates to methods and apparatus for improving the reliability, efficiency and flexibility of service offered to telecommunications users.

Problem

A trend in modern telecommunications switching systems is to have ever larger systems for handling large communities of interest, and for handling a large volume of traffic for each line. The increasing concentration of activities having high telecommunications needs, such as the financial markets, has also provided pressure for increasing the size and capacity of switching systems.

At the same time, there is also a trend toward ever increasing reliance on such telecommunication switching systems. The potential losses arising from even a few minutes of down time of a major exchange, for example New York's Wall Street area, is probably in the millions of dollars. The very large systems do not generally possess extra reliability.

A problem of the prior art is that no economically satisfactory solution has been found to have both very large switching systems and to provide such very large systems with backup facilities in an economic manner.

Solution

The above problem is solved and an advance is made over the teachings of the prior art in accordance with this invention wherein selected lines of a network complex, whose switches are interconnected by a data network, are provided access to any of a plurality of switches (switching systems), of the network complex for originating and receiving telecommunications calls even when all the switches of the complex are in good working order; however, if a switch of a network complex fails, the other switches to which the selected lines have access can serve these lines for both incoming and outgoing telecommunications traffic.

In accordance with one preferred embodiment of applicant's invention, lines and trunks are connected to switching systems via peripheral units. These peripheral units are connected to one or a plurality of multiplexing circuits which are in turn connected to one or a plurality of switching systems of the network complex; at least one of the "one or a plurality" is a plurality. The switches of the network complex communicate among themselves to determine which switching system is to communicate control messages with which peripheral unit. The peripheral units can be simple units such as a subscriber loop carrier, or a line unit which may be equipped with a processor, or more complex units such as a switch module which is processor controlled and performs switching functions (such as AT&T's Remote Switch module) or even a complete autonomous switch connected via a peripheral unit connection, not a trunk connection. The peripheral units communicate with the switch/peripheral unit network 7 (FIG. 1) via the PCM (pulse code modulation) or ATM (asynchronous transfer mode) signals. In the preferred embodiment, PCM signals are used. According to one feature of applicant's invention, the switching systems further communicate among themselves to determine which switching system is to serve which time slot or ATM packet header of each peripheral unit.

Figure 1:
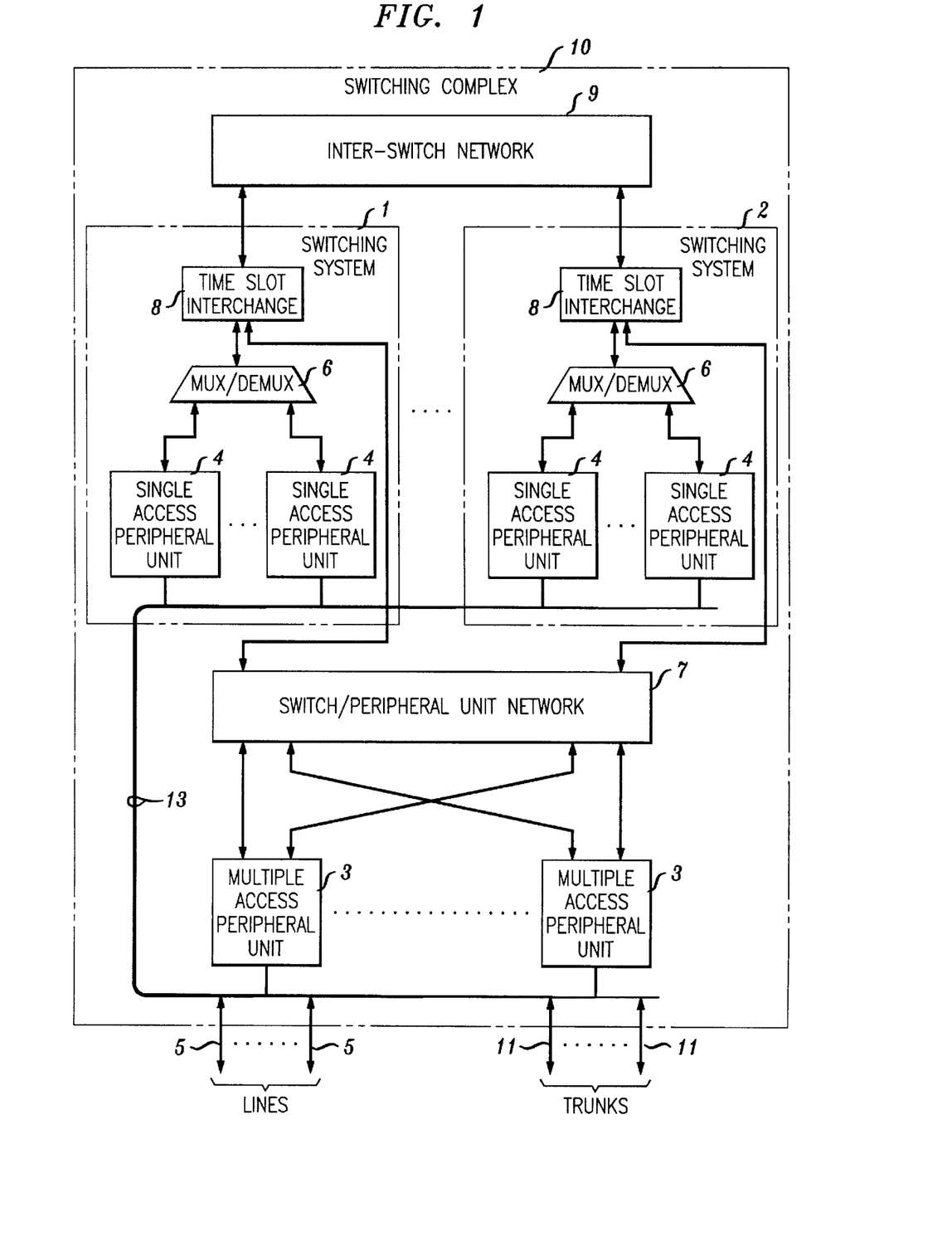
FIG. 1 is a block diagram illustrating the telecommunications complex applicant's invention.

The peripheral units typically communicate with the switching systems through one or more signaling channels and through a plurality of communication channels for serving a telecommunication call. In one preferred embodiment, the signaling channel is switchably connected via the facility (network 7), interconnecting the peripheral unit and the plurality of switching systems of the network complex, to one of the switches of the network complex. When an origination is detected in the peripheral unit, a message is sent to that switching system which either assigns a channel for connecting the caller to one of the switching systems, or passes the message to another switch of the complex for performing the assignment. Thereafter, the call proceeds in basically a normal fashion; however, the network complex, because of its ability to communicate freely among its switches of the network, can be used advantageously to establish a minimum cost connection, for example, by connecting the terminating customer or a trunk leaving the network complex to the same switch which is processing the origination.

In accordance with one preferred embodiment of applicant's invention, the switches are connected to an inter-switch network 9 (FIG. 1) and each switch has access to a limited number of time slots or ATM headers in that network. In one embodiment, attached to the network is a time slot interchanger or ATM switch (preferred mode) for flexibly switching the time slots or ATM headers so that any of a subset or complete set of time slots or ATM headers from one switching system can be connected to any other switching system.

In accordance with one aspect of applicant's invention, each peripheral unit has its signaling channels connected to one switch; or connected to several switches but only processed by one switch. This switch maintains a record of which of the calls or lines of the peripheral unit are assigned to which switch of the network complex and forwards all signaling messages for that call or line to that switch. When a switch fails, the signaling channel is reassigned and the other switches are polled to see which calls of each of the peripheral units are being processed by that switch. Only a single switch is required to control each call entering or leaving the network complex.

In an alternate arrangement as soon as a switch has been assigned to a call, the headers for any messages associated with that call identify that switch; such messages are then automatically routed to that switch via the data network or equivalent used by that switching system to communicate data messages to other switches of the network complex.

BRIEF DESCRIPTION OF THE DRAWING

FIGS. 3-A and 3-B is a flow diagram illustrating the method of establishing calls;

DETAILED DESCRIPTION

FIG. 1 is a block diagram illustrating a network configuration of applicant's invention in one preferred embodiment. Shown are two switching systems 1 and 2 of a group arranged to provide multiple homing to selected lines and trunks. Each of the connected lines 5 and trunks 11, shown in a bundle 13, is connected to either a multiple access peripheral unit 3 or a single access (i.e., direct access to only one switching system) peripheral unit 4. The multiple access peripheral units 3 are connected to multiplex/demultiplex (M/D) units 12 (see FIG. 4) inside the switch/peripheral unit network 7 to gather a large bundle of time slots and the M/D units 12 are in turn connected to the plurality of switching systems 1, . . . ,2. M/D units 6, inside each switch, are connected to single access peripheral units 4 which serve those lines or trunks which do not require multiple access. Note however, that in this type of configuration, the added cost of the extra access of a multiple access peripheral unit 3, versus a single access peripheral unit 4, is low, so that the advantages of the access to multiple switches may well outweigh the cost differential, especially as the technology advances. All switches in good working order are active and serve calls. To the extent that most lines are connected to multiple access peripheral units 3, the entire complex 10 acts predominantly like one giant switch having the efficiencies of such a giant switch; the giant switch has enhanced reliability because its individual components are distributed over a plurality of switching systems 1, . . . , 2.

The M/D units 6 have outputs that are connected to one or more time slot interchangers (TSIs) 8 within a switch. While the preferred mode uses TSIs, other modes of switching, such as ATM can also be used, and the connected blocks appropriately modified. In the preferred embodiment of applicant's invention, the time slot interchanger is that of a 5ESS® SM 2000 unit (manufactured by AT&T Network Systems) which is one-sided and sufficiently large that many switching systems will only contain a single such unit. TSI 8 is connected to the M/D units 6, to M/D units 12 of the network 7, and to an interswitch network 9 for interconnecting switching systems 1, . . . ,2. The connection between TSI 8 and network 9 is such that each TSI has access to all of the other switches of the group of switches 1, . . . ,2.

The object of network 7 (see FIG. 4), is to distribute the outputs of multiple access peripheral units 3 to the various TSI units 8 in the various switching systems 1, . . . ,2. Network 7 comprises a group of fiber optic transmission systems, each transmission system connected from one of the M/D units 12 and to one of the plurality of TSI units 8, wherein each M/D unit is connected to a plurality of TSI units. The result is that any M/D unit 12 communicates with plurality of TSI units 8 via a plurality of time slots. Each of the multiple access peripheral units 3 has access to a plurality of the M/D units 12. The total arrangement gives each peripheral unit 3 access to a large number of time slots in a large number of TSIs of the complex 10.

Figure 3A:
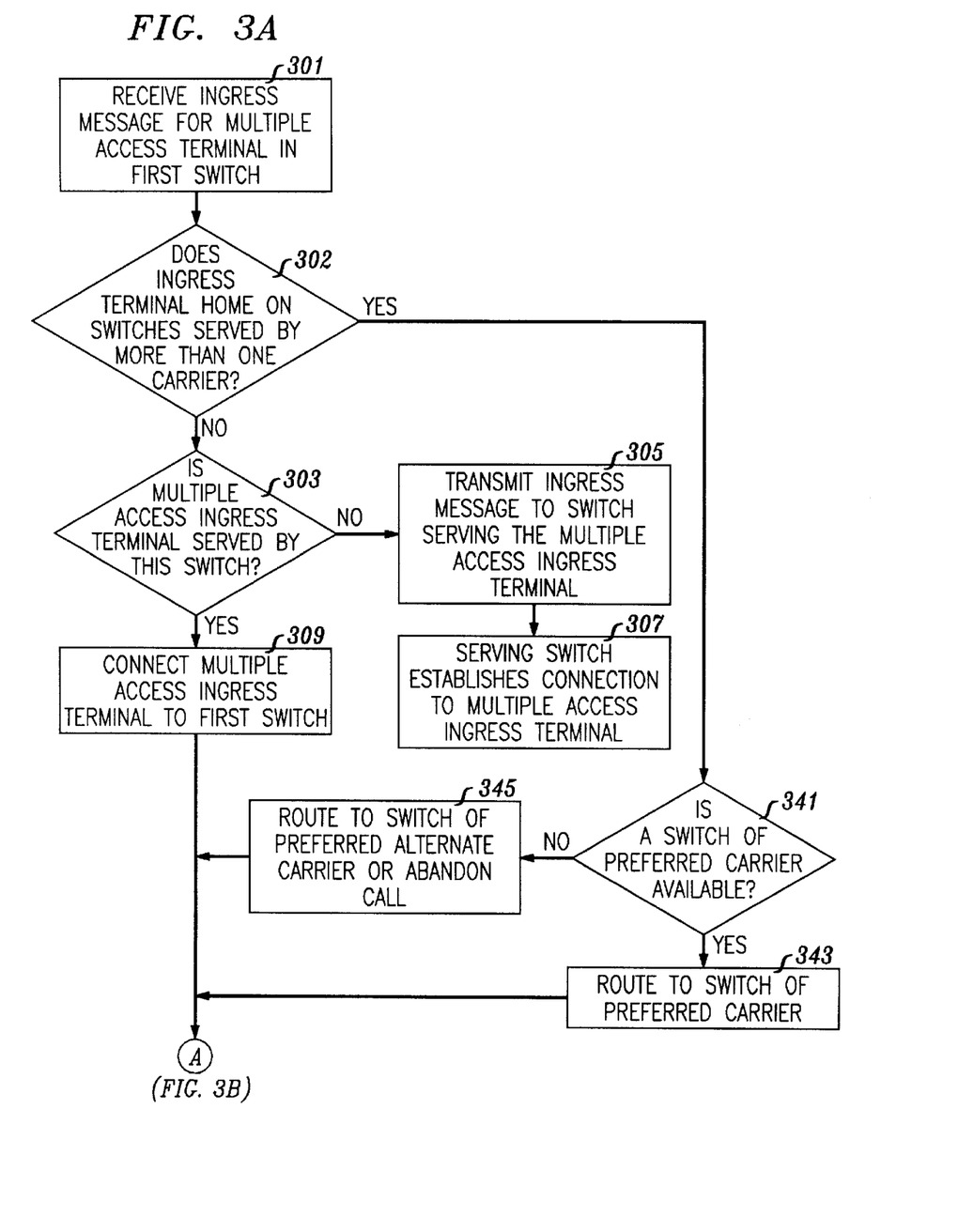
Figure 3B:
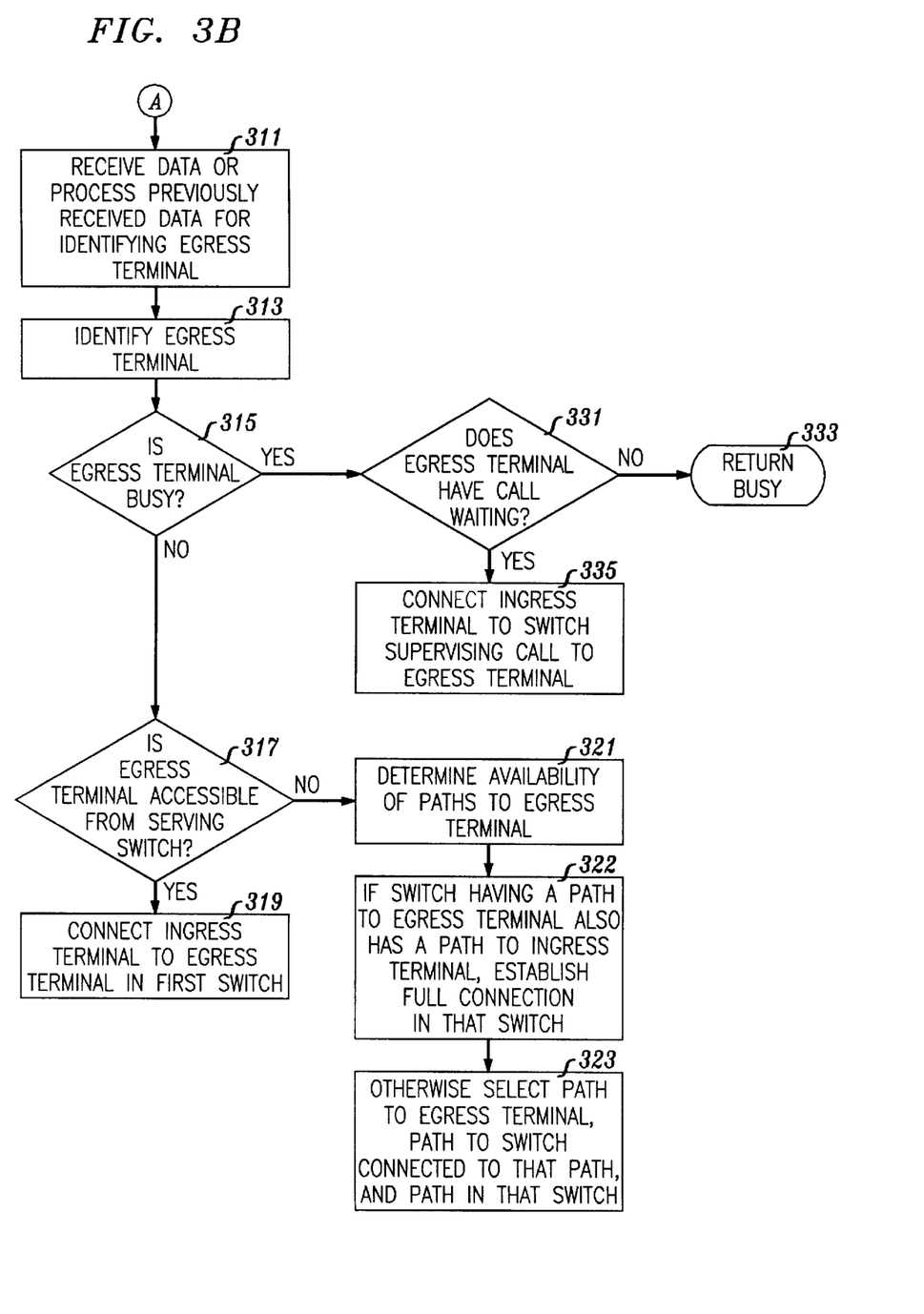

For clarity of the description of FIG. 3, telephone calls are categorized as an intra-complex call (a call from a line on any switching system of the complex to another line on any switch of the complex), an incoming call (a call from a trunk to a switching system of the complex terminating on a line served by a switching system of the complex), an outgoing call (originating on a line served by a switching system of the complex and connected to a trunk served by a switching system of the complex), and a tandem call (a call received on a trunk served by a switch of the complex and terminating on another trunk served by a switch of the complex). In this specification, in order to treat the common features of all these calls without redundant descriptions, any call is treated as a call from an ingress terminal, (which may be either a line or a trunk) to an egress terminal (which may also a line or a trunk).

It is also possible to connect a peripheral unit to two (or more) complexes, by connecting the unit to two (or more) distinct networks 7, each network 7 being connected to switches interconnected by a network 9. In that case, a line on such a peripheral unit can complete an intra-complex call to a very large number of lines and have access to a large number of trunk groups.

Figure 2:
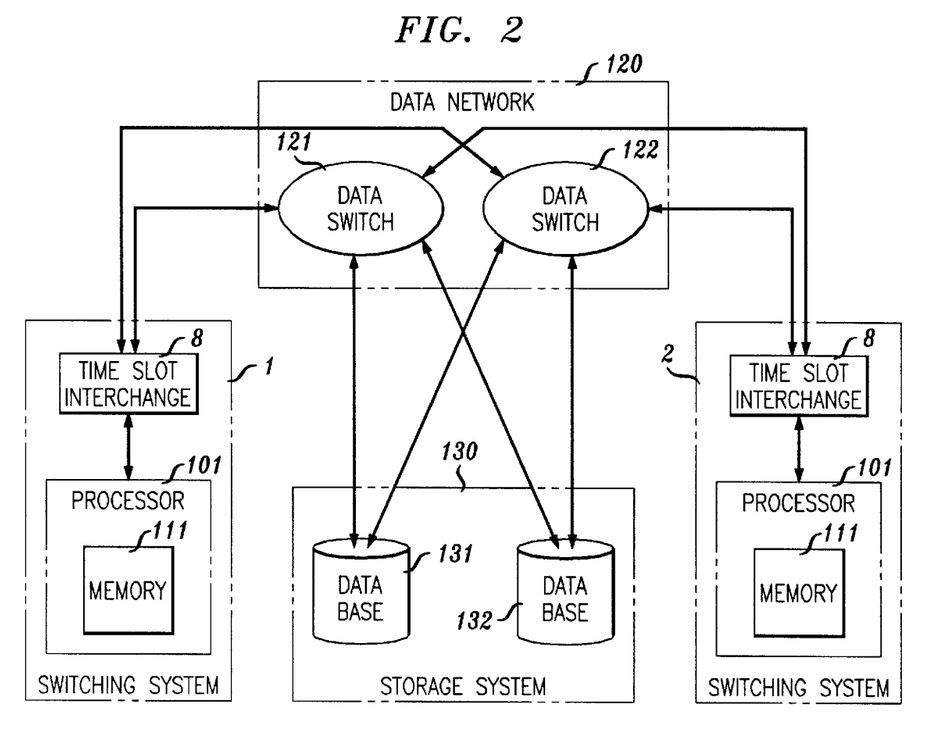
FIG. 2 is a block diagram illustrating the arrangements for exchanging data among switching systems of the complex.

FIG. 2 illustrates the control arrangement. Each of the switches 1, . . . ,2 has a processor 101. This processor includes a memory 111. The data stored in this memory includes both transient data such as the supervisory state of each line and relatively permanent data such as the translation data for that line. (Translation data provides an indication of the features available to a line, and provides data relating a customer's directory number to a line position within the switching network of a switch.)

The switches are interconnected by a data network 120 for exchanging information about the lines and trunks in the system. The data network in this embodiment comprises data links from each of the switches 1, . . . ,2 to each of a pair of data switches 121, 122. Duplicate switches are provided for reliability.

In the preferred embodiment, all switches that are capable of serving a particular line maintain in their own database the full translation information as well as the supervisory state of the line. In such an arrangement it is desirable to broadcast any changes of supervisory state to the other switches capable of serving that line so that each switch can directly make its own busy test to determine whether a line is busy, but make a test for availability using a designated home switching system.

In an alternate embodiment, each multiple access line, i.e., each line connected to a multiple access peripheral unit, as well as each single access line, is assigned one home switch and the data for that line is stored in that switch. If a call is originated on switch 2 and is terminated on a line whose home switch is switch 1, then switch 2 obtains data from switch 1 for completing the call; note that for either embodiment, if the call is to a multiple access line, then the entire call can be handled by switch 2 and it is only necessary to inform switch 1 of the change of the supervisory state.

A storage system 130, duplicated for reliability as two data bases 131, 132, is also available and connected to the data network 120. If one of the switches fails, then this storage system is used to initialize the translation information for multiple access lines previously treated as being "homed" on the failed switch to other switches which will become the new home switches for these lines.

An important consideration in the design of modern switching systems for the US and other markets is the presence of competition in the local exchange area. This requirement for competition means that customers may select which of a plurality of service providers (carriers) will handle their traffic. In general it is expected that a carrier will supply its own switches, although it is conceivable that a carrier may lease the services of the switch of another carrier. For those cases in which a carrier supplies its own switches, traffic from lines served by that carrier or trunks belonging to that carrier are normally connected only to the switches of that carrier. For special cases, requiring a high degree of reliability, the customer may be allowed to specify that, while the first carrier normally carries traffic for that customer, in an emergency, an alternate carrier may be used. Further there is a possibility that a customer may elect to have a portion of the traffic served by one carrier and another portion served by another carrier.

However, for the most frequent case, a call is normally established using a switch of the preferred carrier belonging to or leased by the preferred carrier. Calls to that customer from outside the network complex 10 will be routed over a trunk and via a switch belonging to that carrier, based on data supplied by a number portability data base which provides information as to which carrier serves each customer.

In order to steer a call, arriving from an incoming trunk connected to a multiple access peripheral unit, to a switch of the preferred carrier, the switch receiving the incoming common channel signaling message is a switch of the preferred carrier and this switch can signal to the controller of the peripheral unit 3 to make a connection to one of the switches of the preferred carrier. If a line originates a call, then either the multiple access peripheral unit 3 containing that ingress terminal has memory identifying the preferred carrier for that line and the contents memory are accessed by the controller in order to steer an origination message to an appropriate switch, or the peripheral unit 3 sends an origination signaling message to a connected switch which knows the preferred carrier for each line and sends the basic origination message to a switch of the preferred carrier.

Signaling messages are sent over certain dedicated time slots in the same way as the communications for which they provide signaling. Each of the switching systems 1, . . . ,2 provides a data switching capability to send messages to any of the other switches in the complex 10. The capability can consist simply of the ability to alter headers and send messages to a data switch, 121, 122, which will switch messages based on the header information. Alternatively, the data switch 121, 122 can contain translation information indicating the preferred carrier for each line of the peripheral unit, such as a subscriber loop carrier SLC, which will automatically route each message to a switch of that carrier. Alternatively, the peripheral units can send their messages to the data network 120, which will automatically route each message to a switch of that carrier.

In the preferred embodiment of this invention, each of the switching systems 1, . . . 2 contains complete translation information for all of the lines and trunks of the complex which can be served by that switch. If the complex contains lines and trunks of several carriers, then the information for the lines and trunks of one carrier is retained only in switches of that carrier unless a line or trunk is served by more than one carrier. Each line or trunk has an associated home switching system and the identity of this home switching system will be changed under emergency conditions if the home switching system fails. In addition, each switching system maintains the current supervisory status of the lines for which it has such translation information. When a terminating call is received in a switching system for one of these lines, if it is a line whose supervisory state is stored in that switching system, that switching system initially makes a busy test by consulting its own record; before finally accepting the call on the basis of availability of the line, the switching system makes a request to change the supervisory state of the record maintained in the home switch for that line which home switch then updates the records of the supervisory state of the line in the other switches. Advantageously by maintaining translation information in each switching system, it is not necessary to send all of this information to the switching system receiving a call. Advantageously by using the supervisory state of the home switching system before finally determining that a line is available, race conditions and false connections of a line to inputs are avoided. For the special case in which the peripheral unit is a sophisticated unit having a highly flexible controller and substantial memory (one example of such a flexible peripheral unit is the remote switch module of the 5ESS® switch manufactured by AT&T Network Systems), the supervisory state of a line terminating on such a peripheral unit may be maintained only in the peripheral unit. Because each switch has translation information for such a line, each switch knows that it can access the peripheral unit in order to obtain this supervisory state.

FIGS. 3A and 3B illustrate the process of establishing a call in accordance with applicant's invention. An ingress message pertaining to an ingress terminal on a multi-access peripheral unit is received in a first switching system (action block 301).

Test 302 determines whether the ingress terminal homes on more than one carrier's switch. It is possible that one or more of the switches 1, . . . ,2 of complex 10 can switch calls from more than one carrier. Generally, however, it is necessary to process a call using the switch from the preferred carrier. In case of switch failure, it may be desirable to serve calls from an alternate switch possibly belonging to a different carrier, in order to continue to provide service. This would be the case for emergency calls and might well be the case for calls of customers subscribing to premium, high reliability service.

If the result of test 302 is negative, then the actions of action block 303 and subsequent action blocks are carried out. If the result of test 302 is positive, i.e., the ingress terminal does home on switches of more than one carrier, then test 341 is used to determine whether the switch of the preferred carrier is available. If so, then the ingress terminal is routed to the preferred carrier switch (action block 343). Thereafter, actions of block 311 et. seq. are followed. If not, then the ingress terminal is routed to a preferred alternate carrier (action block 345) if such a preferred alternate carrier has been specified; in the absence of the specification of such an alternate preferred carrier, the call is simply not served.

The ingress message may be a message representing an origination by a line or it may be a message representing a seizure by an incoming trunk. In the latter case, the message may either be a common channel signaling (SS7) message which would include the entire data identifying the terminating number, or, if multi-frequency signaling is used, then the message would include a request to be connected to a multi-frequency receiver which then reports the data (digits) needed to identify the destination. The first switching system determines (test 303) whether the ingress terminal is served by this switching system. An example in which test 303 would have a negative result is if the ingress terminal is served by a carrier other than the carrier that owns or has leased the first switching system. If test 303 has a negative result, then the ingress message is transmitted to a second switching system, serving the ingress terminal (action block 305). The second switching system then establishes a connection to the ingress terminal (action block 307). Subsequently, the actions described hereinafter with respect to the first switching system and with respect to blocks 311–319, are executed in the second switching system. The actions of block 307 are also discussed in more detail with respect to action block 309 executed in the first switching system.

If the result of test 303 is positive, then the ingress terminal is connected to the first switching system (action block 309). To clarify this discussion and to concentrate on the primary flow, all blockage situations are not shown in this flow diagram. With respect to action block 309, a test is made to determine whether any channels are available for connecting the first switch to the ingress terminal. If no such channels are available an attempt is made to connect the ingress terminal to another switch of the same carrier as the first switching system. If such a switch is available and such a switch has a channel available to the ingress terminal then the other serving switch processes the call in essentially the same way as the first switch processes the call as discussed below with respect to actions blocks 311–319. If no other switch of the same carrier as the first switch has an available channel to the ingress terminal (or if there is no other switch of the same carrier in the complex 10) then the call is either blocked, or, if the customer has been provided with service (not available today) wherein in case of blockage, an alternate carrier is used, an attempt is made to route the call via a serving switch of the alternate carrier.

The first switch receives data for identifying the egress terminal or processes previously received data. Previously received data includes the case wherein the ingress terminal is an SS7 trunk, wherein the initial message included the the telephone number of the called party, or is an ISDN (Integrated Services Digital Network) station wherein the original signaling message included the telephone number of the called party. Examples where data has not been previously received are multi-frequency trunks or conventional telephone lines wherein the ingress terminal is first connected to the receiver, for receiving dialed or transmitted digits identifying the terminating telephone number; in that case a connection established in the first switch to a digit receiver.

After data has been received for identifying the terminating directory number, the egress terminal is identified (action block 313). If the directory number is that of a line served by the complex 10, then the egress terminal is a line and is identified using translation data stored in the complex. Otherwise a trunk is required and translations will provide the identity of primary and alternate trunk groups, the selection of which is performed in the serving switch. The hunt of a trunk within a group is performed by a switch that has been assigned this function and which maintains availability data of all the trunks in that group. In this network complex, it is desirable to group all outgoing or two-way trunks having a common destination and common characteristics into a single list of trunks. The hunting of a trunk within such a list whose trunks are spread over a plurality of switches is normally assigned to one of the switches which maintains a record of the status (busy, available, out-of-service) of each of the trunks in the list; the hunting switch selects a trunk and informs the serving switch of the selection. The selection may be biased toward completion of calls within the serving switch by selecting on available trunk accessible to the serving switch via either a single access or a multiple access peripheral unit. These remarks also apply to lines of a multi-line hunt group. Note that trunk groups are assigned to a specific carrier so that the serving switch will select only trunk groups for normally serving the calls of the preferred local or toll carrier (unless at some future time, overflow to trunks of another carrier is allowed).

Once the egress terminal has been identified, test 315 is used to determine whether the egress terminal is busy. Note that the result of test 315 is negative performed if the egress terminal is a trunk. Part of the process of determining the identity of the egress terminal is the determination of the home switch for that terminal. The home switch has the responsibility for maintaining a master record of the supervisory state of a line. If the line is considered busy in any switch, it is considered busy for that call. If the line is considered available in any switch, the seizure and change to busy is not accepted until confirmed by an acknowledgment from the home switch. All changes in supervision are forwarded to all switches serving the line whose supervisory state has changed.

If the egress terminal is an available line, or is a trunk, then test 317 is used to determine whether the egress terminal is accessible from the serving switch. Test 317 is used to determine whether the egress terminal accessible from the serving switch. If so, then the ingress terminal is connected to the egress terminal via the serving switch via a channel from the serving switch to the egress terminal. If the result of test 317 is negative, then the availability of paths to the egress terminal is determined (action block 321). A path, if any, is selected to the egress terminal and a path is selected to the switch connectable to that path (action block 323). Paths are then set up between the serving switch and that other switch by connecting the two switches via network 9, and the ingress and egress terminals are connected through the two switches. If the other switch is also connectable to the ingress terminal, then the entire path can be set up in that other switch by disconnecting the original path from the first switch to the ingress terminal and establishing a connection in the second switch between the ingress and egress terminals via the TSI of the other switch (action block 319).

The busy test may require accessing of the home switch (designated as having primary control of a line). If the busy test as performed in the first switch indicates that the line is busy, then this result may be accepted as representing a busy state. However if the busy test indicates that the line is available, it is necessary to heck with the switch having primary responsibility for the terminating line. (This may be the serving switch but it may be another switch of the complex 10.) In order to update the busy-idle status of that line, and in order to control the updating of the busy idle-status of that line for other switches in the complex, the busy test is both a check to see if the terminating line is already busy and a change in the status of the terminating line if it is not busy.

If the terminating line is busy as determined by a positive result of test 315, then test 331 is used to determine whether the egress terminal has call waiting. If not, then busy tone returned to the ingress terminal (terminal action block 333). If the egress terminal does have call waiting then the ingress terminal is connected to the switch supervising the present call to the egress terminal (action block 335) in order to allow that switch to handle both the present call to the busy egress terminal and the waiting call from the ingress terminal.

Figure 4:
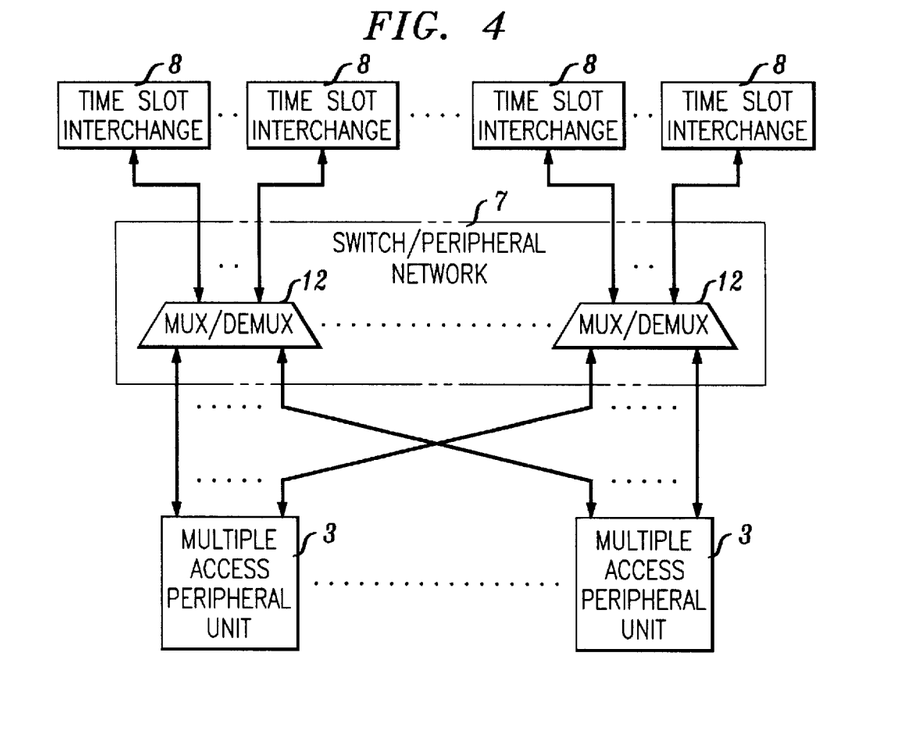
FIG. 4–6 are block diagrams illustrating blocks of FIG. 1.

As previously mentioned, the purpose of network 7 as shown in FIG. 4, is to bring time slots from multiple access peripheral units (MA/PU) 3 to the various switches. Each MA/PU 3 is connected to a plurality of the M/D units 12 that comprise the network 7. Each M/D unit 12 is connected to at least one, but preferably to a plurality of TSI units 8. While simple dual homing could be accomplished by connecting each MA/PU 3 to two M/D units 12, it is advantageous to connect each peripheral unit 3 to as many M/D units as possible in order to further enhance reliability and to maximize the number of calls that can be advantageously established as intra-complex calls. Having made the connection to an M/D unit 12, it is no longer necessary to connect each M/D unit to more that one switch, although it is often desirable to do so. For example this may be advantageous if each MA/PU 3 has access to 4 M/D units 12 and there are 8 switches in the total complex. Under these circumstances, it would be desirable for each M/D unit 12 to be connected to two switches. For example, an arrangement like that of FIG. 4 can serve a complex of 4 switching systems wherein each MA/PU 3 has access to 4 M/D units 12, and each M/D unit 12 has access only to a single switching system. Switching systems then have access to any peripheral unit via the M/D unit 12 to which they are connected. Alternatively, a MA/PU 3 can be connected to only one M/D unit 12 provided that the M/D unit accesses two or more switches. Ideally, each peripheral unit accesses multiple M/D units, and each M/D unit accesses multiple switches.

FIG. 4 illustrates one preferred implementation of network 7. Each multiple access peripheral unit 3 is connected to a plurality of M/D units 12. Each of the M/D units 12 in turn is connects to one or more TSI units 8 which, depending on the number of switches, are in a single or in several switches. In this preferred embodiment, each MA/PU 3 can access any TSI of the switching complex. The links between the MA/PUs 3 and the M/D units 12 in one specific case are T-carrier links, for example, the 4 T-carrier links emanating form one subscriber loop carrier system. The links from M/D units 12 to the TSI units 8 in the preferred embodiment are input links of the TSI unit. In the case of the 5ESS-2000, these input links are carried over fiber optic systems and each carry 512 64 kilobit/second channels.

FIG. 1 shows a single network for network 7. Since many of the peripheral units are remote, it may be desirable to associate a separate switch/peripheral unit network 7, connected to a plurality of the switches in switching complex 10, with a group of these peripheral units.

Some of the MA/PUs 3 can serve wireless stations, so that the connection to "lines" can be wireless connections. Further, some of the "lines" can be connected to a private branch exchange (PBX). More broadly, the peripheral units serve customer terminals.

Figure 5:
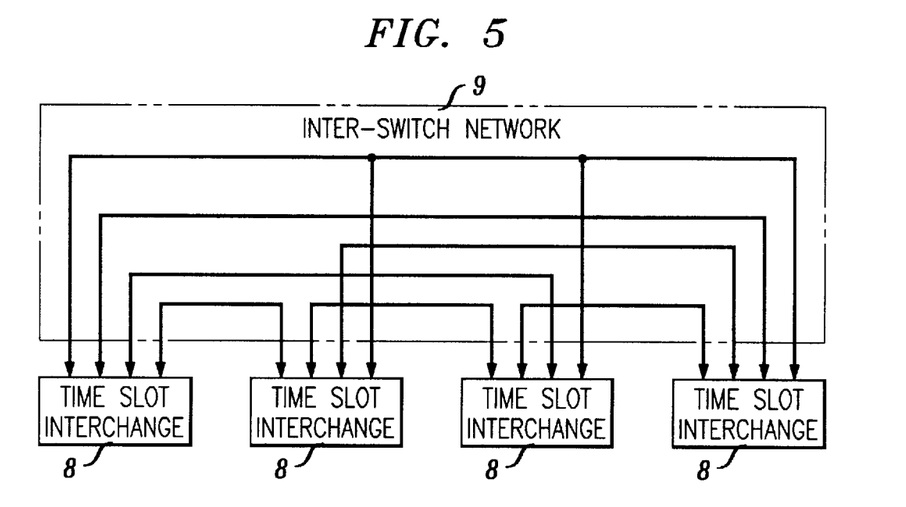

FIG. 5 illustrates one preferred embodiment of network 9. Network 9 is used to carry traffic between ingress and egress terminals when each of these terminals is connect to a single access peripheral unit 4 and the single access peripheral units 4 are connected to different ones of the switching systems 1, . . . ,2. Network 9 can also be used when there is blockage in the access to the MA/PU 3 connected to the egress terminal in the network 7 and it is necessary to go via another switch in order to access that peripheral unit. Network 9 can also be used to insert a third switch, used as a tandem between two switches, into a connection. In the specific example shown if FIG. 5, network 9 interconnects four TSI units 8 and each of these four TSI units are in a different switch. Each of the TSI units 8 are interconnected by one direct link of FIG. 5, and in addition all four units are interconnected by one common overflow link. Other alternative interconnection patterns are also possible; the principles of such interconnection patterns are well known in the field of switching networks. For example, a random slip multiple where subsets of only 3 TSIs are multipled together can be used.

Figure 6:
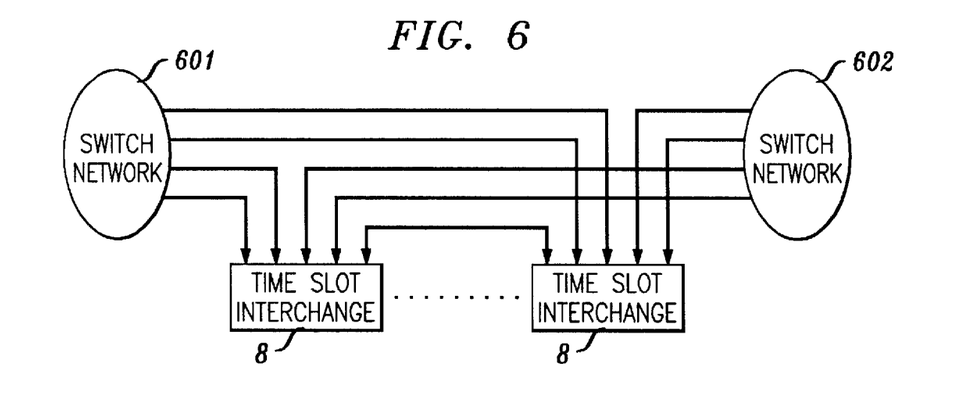

FIG. 6 illustrates the use of two switching network 601, 602 as part of network 9 to interconnect the switches of the network complex 10. One example of networks 601, 602 for accomplishing this function are two large ATM switching networks. In that case, interfaces to the TSI unit must be provided or an ATM switch substituted for the TSI 8.

For lines having multiple access capabilities, a number of different trunk groups can be used for routing calls to that line. A data base such as a number portability database used for determining which telephone numbers are accessed via which trunk groups, (usually by specifying a route index that leads to an ordered examination of these trunk groups) can store data to allow for the broader range of trunk groups for completing the call. The choice of trunk groups can further be influenced by the identity of the carrier seeking to complete the call.

Figure 7:
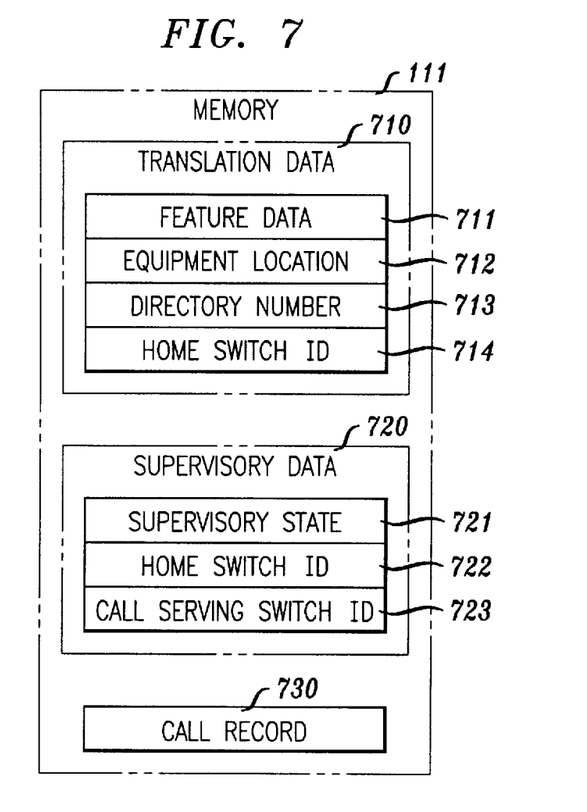
FIG. 7 is a memory layout diagram illustrating data maintained in a switch of the complex.

FIG. 7 illustrates information which is retained in the various switches of switching complex 10 in order to implement applicant's invention. It illustrates the data which is maintained for a multi-access line. Block 710 is the translation data which is accordance with principles of applicant's invention is maintained in each of the switches to which the line may have access. In the case of a switching complex in which each line does not have access to all switches, for example if switches belong to several different carriers and the line is not served by all of these carriers, translation data and for that matter supervisory data and call records need not be maintained in those switches to which the line has no access. Translation data, which includes feature data for the line such as indications whether the line may use add-on, has the call waiting feature, can conference calls or has an abbreviated dialing list, is, in accordance with applicant's invention, maintained in each of the switches, which can serve the multi-access line. In alternative embodiments some or all of this translation data may be retained only in the home switch and can then be accessed via the data network as needed to process a call. The equipment location of the line as identified by its directory number (block 712) and the directory number of the line as identified by its equipment location (block 713) are also maintained here. The equipment location is maintained for incoming calls in order to translate the directory number to an equipment location for completing a call; the directory number is maintained in order to make a billing record for an outgoing calls and in order to provide an automatic number identification (ANI) signal to be forwarded with a call. Additionally, in accordance with applicant's invention, the identification of the home switch is stored. In this embodiment this identification is stored twice, once in the translation data block, which block is carefully controlled as far as writing access is concerned, and once in the supervisory data block where it is used as described below.

A supervisory data block for a multi-access line (block 720) includes: information on the supervisory state (block 721) (busy, idle or temporarily or permanently out of service); a home switch identifier (block 722) used on an incoming call to confirm that the terminating line is available, and a call serving switch identifier (block 723) used, for example, for a line which has call waiting service and is occupied on a call so that a second call can be routed to the switch serving that call. If the switch is actively serving a call, a call record 730 is used to record in the conventional fashion the various details of a call (such as the path used for providing a connection in the call, the time of answer used in order to build up a billing record, and special information for call waiting calls and calls which have been temporarily put on hold during a call waiting situation).

The invention claimed is:

1. A telecommunications network complex comprising:
   a plurality of switching systems;
   a plurality of peripheral units each connected to a plurality of customers and each having a plurality of outputs;
   a first switching network for switchably interconnecting outputs of said peripheral units with said plurality of switching systems; and a second switching network controlled by said plurality of switching systems for interconnecting said plurality of switching systems;

wherein each of said peripheral units serves a plurality of customer terminals;

wherein said first network connects each of at least one of said peripheral units to more than one of said plurality of switching systems;

wherein connections from and to at least some of customers connected to said at least one of said peripheral units are connected at different times to different ones of said more than one of said plurality of switching systems.

2. The complex of claim 1 wherein each of said plurality of switching systems has at least one TSI (time slot interchange) unit, and wherein said TSI interconnects time slots from said first and said second network.

3. The complex of claim 1 wherein said second network comprises a plurality of non-switchable connections.

4. The complex of claim 1 wherein said second network comprises a third switching network for flexibly interconnecting said switching systems.

5. The complex of claim 4 wherein said third switching network comprises an ATM (asynchronous transfer mode) switch.

6. The complex of claim 5, wherein each of said plurality of switching systems is connected to said third network by at least one TSI (time slot interchange) unit.

7. The complex of claim 6 wherein said at least one TSI unit connected to said ATM switch comprises a PCM/ATM (pulse code modulation/ATM) converter.

8. The complex of claim 1 wherein said first network comprises non-switchable connections for interconnecting said peripheral units and said switching systems.

9. The complex of claim 1 wherein one of the at least one of said peripheral units is a stand alone switch.

10. The complex of claim 1 wherein at least one of said plurality of said peripheral units is a processor controlled switching module for performing switching functions.

11. The complex of claim 1 further comprising a data network for interconnecting said plurality of switching systems and for transmitting signaling messages among said plurality of switching systems.

12. The complex of claim 11 wherein said data network is also for interconnecting at least some of said peripheral units with said plurality of switching systems.

13. The complex of claim 1 further comprising peripheral units connected to said first network, for serving trunks.

14. In a telecommunications network complex for interconnecting a plurality of customer terminals comprising a plurality of interconnected switches, a method of establishing a call between an ingress customer terminal and an egress customer terminal of the complex comprising the steps of:

providing access via a switching network for ones of said plurality of customer terminals to more than one of said plurality of interconnected switches;

in a serving switch of said interconnected switches, receiving an ingress message from an ingress customer terminal;

receiving data for identifying an egress customer terminal for said call in said serving switch;

said egress customer terminal connected to a peripheral unit having access to more than one of said plurality of interconnected switches;

determining whether the ingress and egress customer terminal can be accessed by the serving switch; and if the ingress and egress customer terminal can both be accessed by the serving switch, connecting the ingress customer terminal and the egress customer terminal to the serving switch and establishing a connection between the ingress and the egress terminal through the serving switch.

15. The method of claim 14 further comprising the step of:

maintaining a supervisory state for a terminal in any switch to which that terminal has access.

* * * * *